United States Patent [19]
Hirshon

[11] 3,794,303
[45] Feb. 26, 1974

[54] METHOD AND APPARATUS FOR AERATING BODIES OF WATER

[76] Inventor: Benedict E. Hirshon, 36 Kenwood Rd., Brookline, Mass. 02167

[22] Filed: June 11, 1973

[21] Appl. No.: 368,724

Related U.S. Application Data

[63] Continuation-in-part of Ser. No. 98,656, Dec. 16, 1970, abandoned.

[52] U.S. Cl. .......... 261/61, 261/64 R, 261/77, 261/91, 261/92, 261/93, 261/120, 261/123, 261/124, 261/DIG. 75
[51] Int. Cl. .......... B01f 3/04
[58] Field of Search ...... 210/220; 261/59, 64 R, 61, 261/65, 69, 77, 92, 91, 93, 120, 123, 124

[56] References Cited
UNITED STATES PATENTS

| | | | |
|---|---|---|---|
| 1,160,200 | 11/1915 | Robbins | 261/177 |
| 3,405,920 | 10/1968 | Lefrancois | 261/123 |
| 3,616,919 | 11/1971 | Feddern | 210/169 |
| 3,653,641 | 4/1972 | Evon | 261/120 |
| 2,077,907 | 4/1937 | Streander | 261/77 |
| 1,619,430 | 3/1927 | Mauran | 261/77 |
| 1,867,143 | 7/1932 | Fohl | 261/123 |

FOREIGN PATENTS OR APPLICATIONS

| | | | |
|---|---|---|---|
| 1,163,168 | 9/1958 | France | 261/DIG. 75 |

*Primary Examiner*—Tim R. Miles
*Assistant Examiner*—Steven H. Markowitz

[57] ABSTRACT

Method and apparatus for aerating bodies of open water utilize unbalanced water columns interconnected at their upper ends to provide continuous aeration of the water at any desired depth. The head on one column is attained by the introduction of air into the other column which serves both to raise and to aerate the water therein. Alternatively, the water may be circulated by mechanical means and the air introduced at the top of its travel. Undissolved air is permitted to escape as it passes between the columns before it enters the return column.

36 Claims, 17 Drawing Figures

METHOD AND APPARATUS FOR AERATING BODIES OF WATER

The present application is a continuation-in-part of Ser. No. 98,656, filed Dec. 16, 1970 and now abandoned.

My invention relates to methods and apparatus for the year-round aeration and circulation of aerated water in bodies of water and has, among other features, the unique ability to provide continuous aeration to the bottom of a body of deep water without causing undue upward convection.

BACKGROUND OF THE INVENTION

Oxygen is constantly depleted, particularly in the lower waters of our streams, lakes and ponds, by the action of decaying vegetation and other organic matter, and by the oxygen requirements of all the living organisms in the water from bacteria up to fish. The need for an artificial supply of oxygen to supplement that provided by natural means becomes apparent. Most particularly is this so for deep water below the thermocline that receives oxygenated water only in the spring and fall turnover of the waters, when the surface waters warm or cool through about 39°.

Bubbling air directly into the water at the bottom, as is done in aquariums, would involve great expenditure of energy where the water is very deep - about eight times as much at 40 feet as is needed at four feet for the same amount of air. Furthermore, the bubbles would sweep the aerated water upward where it would mix and not regain the bottom.

Reservoir water is commonly aerated by spraying it into the air. The energy input per cubic foot of water sprayed by this system equals 144 foot pounds per pound per square inch gauge pressure at the spray nozzle.

Another system of aeration comprises the vigorous hurling of water in a low trajectory against a surrounding side wall whence it is guided downward. Here again the energy input per unit is relatively large.

THE PRESENT IVNENTION

The general objective of the present invention is to make possible aeration of water at any depth in an open body of water such as a lake, pond, river or bay without the above referred to objectionable features attending, an objective attained by methods and apparatus employing water columns.

In terms of method, the broad objectives of the invention are attained by continuously withdrawing water from a desired depth in a body of open water, aerating the water, ridding it of undissolved air, and returning it, aerated, to a desired depth.

In terms of apparatus, the broad objectives of the invention are met by providing aeration for such open bodies of water, each aerator having depending inflow and outflow ducts or conduit portions and a transfer duct or portion with which the upper ends of the depending portions are in communication. The inflow portion has its inlet at a desired depth and disposed in a desired direction and the outflow portion has its outlet at a desired depth and disposed in a desired direction. Means in one of the portions is operable to effect a continuous flow upwardly through the inflow portion, into and through the transfer portion and downwardly through the outflow portion and to aerate the circulating water before its entry into the outflow portion. The transfer portion is oriented to provide a time delay in the flow of the elevated water to permit the escape of undissolved air before its entry into the outflow portion.

Other objectives of the invention are to enable various means to be employed to effect the circulation and aeration of the water and these objectives are attained by the use of air both to aerate and raise the water by bubbling air in a transverse zone in the inflow portion or by the use of other agencies such as an impeller, propeller, water wheel, turbine, or the like to create an imbalance between the water columns in the inflow and outflow portion and to aerate the circulating water by various means such as bubbling air in the intake portion or at the top of its travel or by flow induced aeration such as by flowing the elevated water through a venturi arranged to draw in air, or by using an impeller to effect the circulation and to entrap and release air as it rotates.

Other objectives of the invention are to enable aeration to be effected under severe icing conditions, to enable aeration to be effected to the bottom of the body of water without undue upward convection and to effect the aeration and mixing of water between predetermined depths.

The great economy of energy provided by the use of my invention is made apparent by the following considerations.

It is universally known that a body falling through sixteen feet acquires a velocity of thirty two feet per second. It takes proof to convince even an engineer that a free fall of one-sixteenth foot imparts a velocity of two feet per second, and that a fall of one-sixty-fourth foot, three-sixteenths of an inch, imparts a velocity of one foot per second. Paradoxically, a cubic foot of water, weight 62.4 pounds, traveling at a velocity of one foot per second has kinetic energy of slightly less than one foot pound.

For a better understanding of the invention reference is made to the following explanations of the forces involved:

The velocity given to a body falling freely from a height of one-sixteenth foot (three-quarters inch) equals about $8 \ \sqrt{1/16} = 2$ feet per second. To exemplify forces involved in my invention, let us assume two columns of water of essentially the same temperature, one drawing water from a 50 foot depth and the other discharging at the same depth with a constantly maintained imbalance of 1/16 foot in one column. The accelerating force would be 1/1600 G working through 100 feet. The velocity theoretically obtained would be $\sqrt{2G/1600 \times 100} = 8 \ \sqrt{1/16} = 2$ feet per second. Assuming that much of the theoretical lift energy is lost to turbulence in the lift and at the intake and discharge a remaining velocity of 1 foot/second can be reasonably assumed.

These figures are made possible by the fact that under these flow conditions all the water in the system is of the same density. Work performed in raising dense water through a less dense medium is returned by the denser water descending through a less dense medium. Where water density is essentially the same through a considerable range of depth, as happens in very deep water or cool winter conditions, the above is equally true if water raised from one depth is returned to a different depth having essentially the same density.

It is readily apparent that there are no forces causing upward convection where densities are the same. If, therefore, aerated water of a given desnity is discharged horizontally into a medium of the same density there are no forces causing vertical circulation. If water of the maximum density obtaining in the water is discharged vertically into a different depth of maximum density it will engender mixing in depth without rising to a level of lesser density.

This lift can be obtained by bubbling one cubic foot of air per second at a four foot depth per 15 square feet of duct (6.7 percent), or at a five foot depth per 20 square feet (5 percent) of the duct or by gentle mechanical action. My apparatus departs widely from the general conception of an air lift. Whereas, in the conventional air lift, air is generally introduced in large volume at the greatest available depth into a small duct in order to give considerable force or velocity to a small cross section of water, my invention, where air bubbles provide the circulating force permits use of only a minimal amount of air sufficient to assure oxygen saturation at minimal pressure to a large cross section of duct.

The solubility of oxygen in forty degree water is 13.1 mg./liter which approximates the amount of oxygen in 50 ccs. of air per 1000 ccs. of about 5 percent of the volume of water, whatever the units used.

Although the above cited example reflects optimum economy of power input per given volume of water aerated, it need not necessarily yield the highest overall economy. Doubling the lift effect would speed up the flow some 40 percent.

Where servicing costs are to be considered, power costs become in part secondary, so that increasing the amount of air supply or otherwise increasing the circulating forces while giving a less than proportionally increased delivery of aerated water, might well be preferable. There is nothing beyond economic considerations to preclude bubbling at the full depth. Again, a more than theoretically adequate supply of oxygen may be necessary to supply the requirements of aerobic bacteria. Furthermore, it may be desired to bring the warmer waters to the bottom to accelerate chemical action. This involves additional effort in order to force the lighter waters through a denser medium.

A particular objective of the invention is to enable it to be practiced in a body of water that is frozen over, an objective attained by effecting the communication between the ducts within a chamber located below the surface and having means to permit the escape of air into the surrounding water therefrom on a predetermined buildup of the air pressure therein.

The design and construction of the various portions of the apparatus may be varied according to application. Usually the top portion would be made long and sufficiently wide to provide stability under wave and wind action and would be made of rigid material such as plastic or metal, sufficiently braced to withstand pressure difference between the interior of the duct and the outside water.

Particularly are strength and rigidity necessary where the top portion of the apparatus is covered or frozen over, the local pressure difference between interior and exterior being 5.2 pounds per square foot per inch of air height above the top of the interior water.

The ascending or inflow duct is preferably long and narrow in cross section at its upper portion. This allows for an intimate mix of air bubbles with the water from one or at most two bubbling tubes. It also allows transfer of aerated water to the descending or outflow duct with a minimum depth difference between upper and lower portions of the water undergoing transfer. The portions of water transferred at the lower level will have received less lift effect and aeration time. The remainder of the inflow duct and of the outflow duct may be of any desired cross-sectional size and shape.

The ascending and descending ducts, particularly where they are long from top to bottom or in a moving current, may be made of light flexible material with braces at intervals and with weights attached to keep them extended. This permits of inexpensive construction and ease in bringing it to its location. It also permits yielding of the motions of the surrounding water, thereby avoiding the need for great strength and very heavy mooring.

In the accompanying drawings, there are shown embodiments of the invention from which these and other of its objectives, novel features and advantages will be readily apparent.

Figure 1:
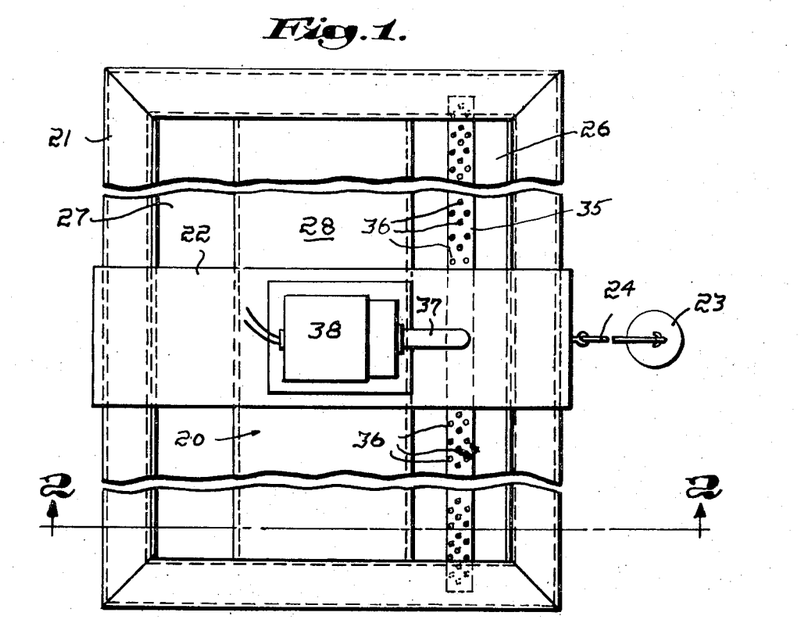
FIG. 1 is a top plan view of aerating apparatus in accordance with the invention broken away to foreshorten the drawings.
Figure 2:
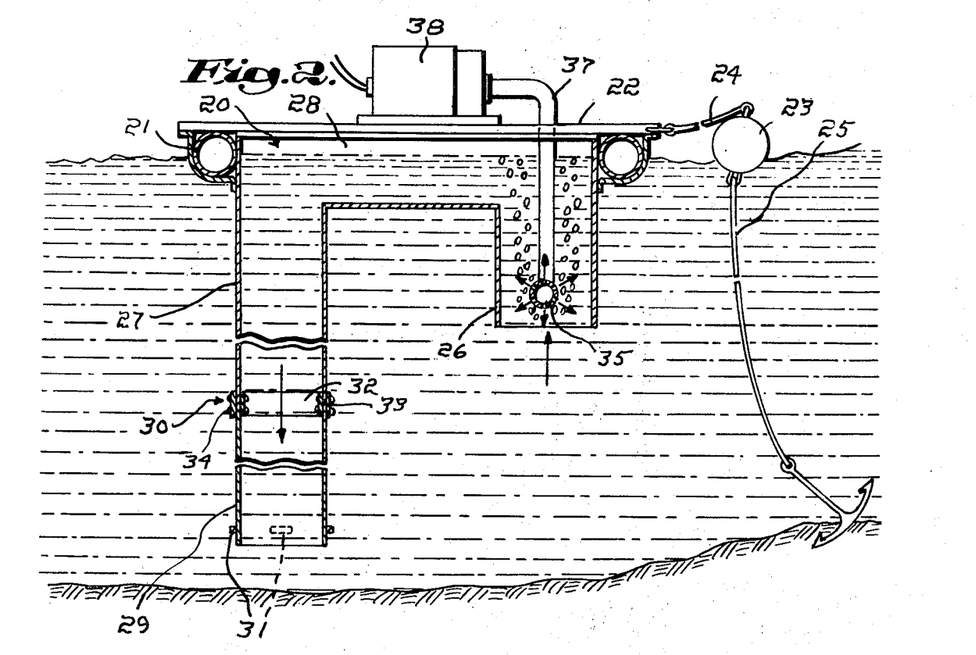
FIG. 2 is a section taken approximately along the indicated lines 2—2 of FIG. 1.

The embodiment of the invention shown in FIGS. 1 and 2 illustrates the elevating of water from one depth and returning it appropriately aerated to a greater depth.

In the embodiment of the invention illustrated by FIGS. 1 and 2, the aerator, generally indicated at 20 is supported by a float 21 provided with a support 22 moored to a buoy 23 by the line 24, the buoy 23 being secured to an anchor line 25.

The aerator 20 has an inlet duct 26 and a reutrn duct 27 opening into opposite ends of a transfer channel 28. Both ducts are relatively long and narrow in cross section. The return duct 27 is shown as longer than the duct 26 and as including an extension 29 secured thereto as by the connection generally indicated at 30. The extension 29 is desirably made of flexible, lightweight material and hence is provided with weights 31 at its outlet end. The connection 30 is shown as including inner and outer frames 32 and 33 with bolts 34 clamping the abutting ends of the ducts between them.

Within the inlet duct 26 there is an air distributor or bubbler tube 35 provided with a multiplicity of ports 36. The tube 35 extends horizontally from side-to-side of the duct 26 and is supported as by the pipe 37 through which air is delivered to it from a suitable source of air under pressure 38 mounted on the support 22. The air source 38 may be of any type and may, for example, be powered by a portable generator, not shown, that may also be mounted on the support 22. It will be noted that the tube 35 is located relatively close to the surface of the water and that the outlet of the extension 29 is close to the bottom.

In use, the air discharged as bubbles through the orifices of the tube 35 is effective both to aerate and to raise the water above its normal level providing for a flow through the transfer channel 28 and into the return duct 27. As it flows through the channel 28, the air bubbles escape. The water is raised to provide a sufficient head to force the aerated water through the return duct 27 despite the higher density of the water at the lower level. The lighter aerated water projected into the heavier ambient water engenders turbulence thereby causing a mixture of both at depths between the intake and discharge depths.

Figure 11:
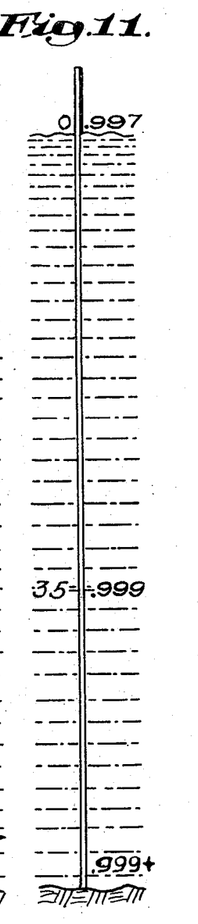
FIG. 11 is a view indicating the approximate density of water at the surface and at a representative critical depth.

Reference is now made to FIG. 11 wherein the body of water is assumed to be a deep lake. Such a lake has, during summer months, at a depth typically in the neighborhood of 35 feet, a layer, the thermocline, separating warmer and usually well aerated upper water from considerably colder lower water that is often so deificient in oxygen as to make a lake, otherwise suitable for trout and salmon as far as temperature is concerned, unable to support a reasonably population of such fish. In various layers, the densities of such waters vary with bottom water having a specific gravity of, say, 0.999+ and above the thermocline in the neighborhood of 0.999 at 35 feet to 0.997 at the surface.

Figure 3:
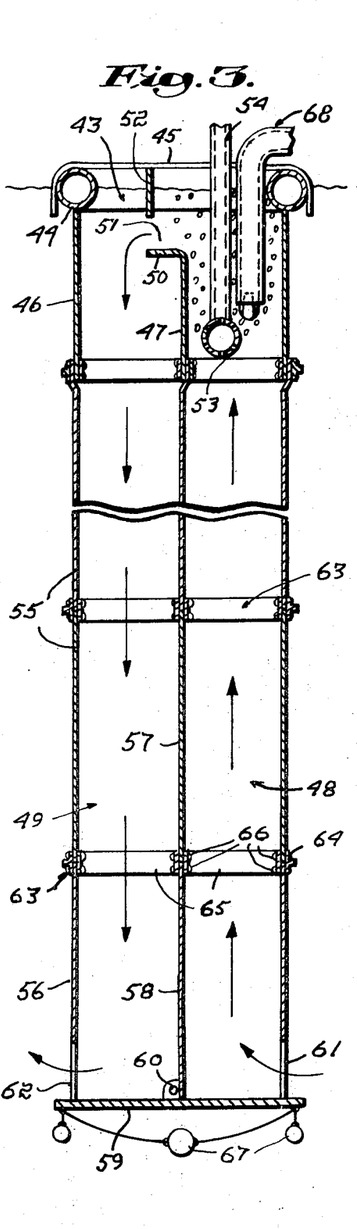
FIG. 3 is a section taken vertically through both ducts of aerating apparatus in accordance with other embodiments of the invention.
Figure 4:
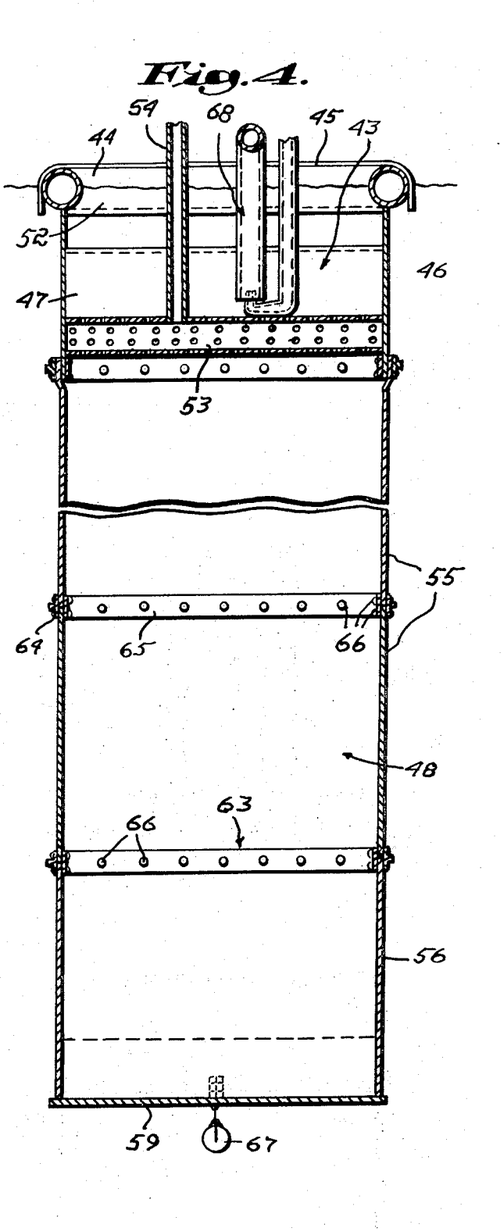
FIG. 4 is a section taken vertically through the inflow duct with the air distributor shown in section.

The aerator adapted for use where water is to be withdrawn from and returned to the same depth and therefore adapted for use where a thermocline exists is shown in FIGS. 3 and 4. One advantage of this procedure is to deliver aerated water of essentially the same temperature and density as that of the surrounding water. The aerated water, being of the same density can spread out without causing upward convection and mixing with warmer water thus providing aeration and maintaining suitable environment for "cold water" fish.

The aerator is generally indicated at 43 and is supported by a float 44 having a support 45. The aerator 43 includes a head portion 46 divided by a partition 47 providing an inlet duct 48 and a return duct 49 with the partition 47 having a flange or baffle 50 disposed towards the return duct 49 to provide a transfer channel 51. Because the channel 51 is relatively short for ensuring the escape of air from the aerated water flowing therethrough, the support 45 has a transverse bubble barrier 52 overlying the edge of the flange 50 and extending slightly below the surface of the water holding back bubbles near the surface. The air distributor or bubble tube 53 may be the same as the tube 35 and is, accordingly, not again detailed. The air delivery pipe is indicated at 54 but the air source is not shown.

It will be noted that the aerator 43 includes a number of intermediate sections 55 and a bottom section 56 having partitions 57 and 58, respectively, providing extensions of the ducts. The sections are shown as of flexible material and are identical except that the bottom section has a closed bottom 59 hinged as at 60 to its partition 58 and inlet and outlet ports indicated at 61 and 62, respectively. The use of flexible material in the construction of the sections is important to low cost, light weight, and ease in carrying them but requires that they be braced against pressure differentials. For that reason, the joints between the two sections are shown as having connections generally indicated at 63. Each of these, while similar to the connections 30 includes an outer frame 64 and an inner frame 65 for each duct interconnected by bolts 66. The bottom 59 is provided with weights 67. There is nothing to preclude the use of a rigid construction as might be preferred for a permanent installation.

Under operating conditions both inlet and outlet ducts will be in balance and a minimum lift will be required. For starting in summer, in order to eliminate the warmer upper waters from the aerator, which might otherwiese require a greater lift than its capability, I have shown an auxiliary air lift 68 having its discharge directed overboard. The air lift 68 may be portable or permanently attached to the float 44 and the blower thereof may be used to actuate it. In general, an initially greater lift is used to flush out the warmer surface waters.

In a system remote from shore, as in a large lake, fuel servicing of the system must be by men in boats or over the ice in winter. There will be periods when a boat cannot be used and the ice will not safely support men and equipment. The system will stop operating for lack of fuel and the water surface within it will freeze and it cannot operate if the air cannot escape.

If the thickness of ice formed does not reach to the level of the transfer channel and if it is possible to chop a hole in the ice, thereby providing an air vent, the system can be restarted. Once restarted, the flow of warmer water from a lower level will melt the surface ice in the system.

There is no natural aeration of the water during ice conditions and the loss of oxygen often causes what is known as "winter kill" of fish. It is, therefore, desirable that aeration be continued through the winter.

Figure 5:
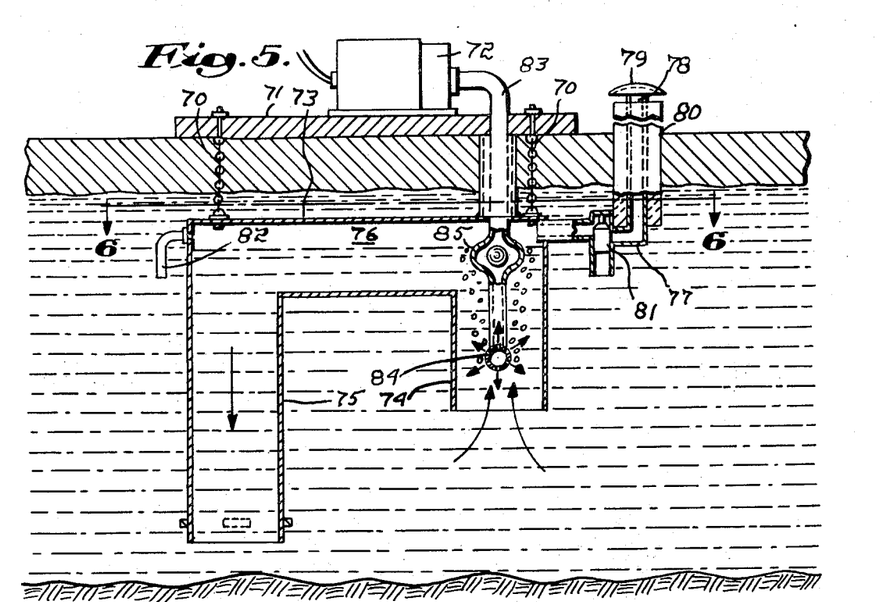
FIG. 5 is a view similar to FIG. 2 illustrating an embodiment of the invention especially designed for winter use.
Figure 6:
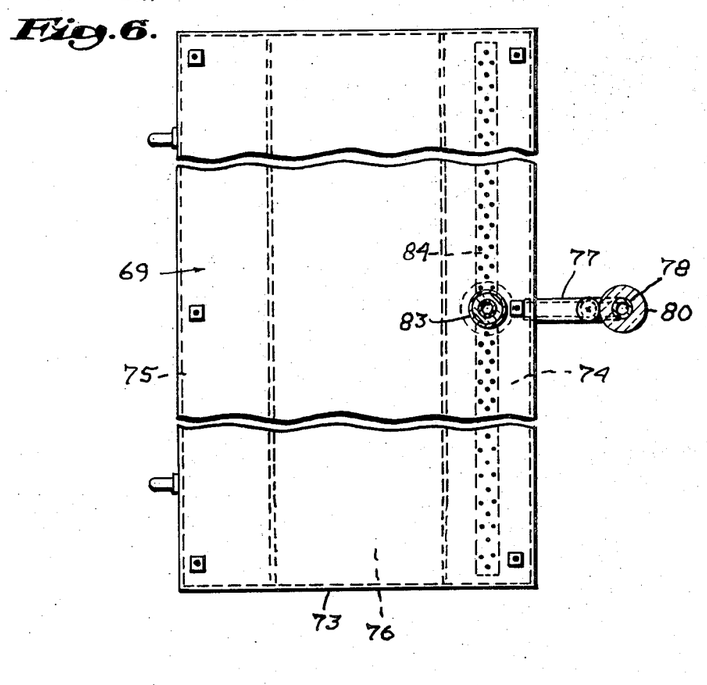
FIG. 6 is a section taken approximately along the lines 6—6 of FIG. 5 and broken away to foreshorten the drawings.

If it is possible to keep apparatus such as is shown in FIGS. 1 – 4 in winter operation, either system could aerate the water at optimum efficiency. If this is not possible, the embodiment of the invention illustrated by FIGS. 5 and 6 provides a feasible basis for maintaining the oxygen reauirements of the water.

In this embodiment of the invention, the aerator generally indicated at 69 is suspended by a flexible support 70 from a float 71 provided with a suitable air source 72 and the means, not shown, by which it is powered. The supports 70 are of sufficient length to support the aerator under the ice. The aerator 69 comprises a chamber 73 with inlet and outlet ducts 74 and 75, respectively, opening into opposite sides thereof with the intermediate part serving as a transfer channel 76. A conduit 77 leads from the upper part of the chamber 73 and is provided with a vertically disposed vent 78 having its outlet protected by a shield 79 and extending through a sleeve 80 of a crushable plastic to protect it from damage by the ice. The conducit 77 is adapted to be closed by a float operated valve 81 and to be opened when the air pressure in the chamber 73 builds up to a predetermined extent. An additional air vent in the form of an elbow 82 is provided which will operate at a slightly higher pressure, should the vent 78 become inoperative.

The float 71 is shown as having the air delivery pipe 83 from the air source 72 extending downwardly through the chamber 73 and in communication with the air distributor or bubble tube 84, which may be identical to the tube 35, with an intermediate normally open float valve 85 adapted to be closed if the water tends to rise in the pipe 83 should the power source fail.

The efficiency of this apparatus is much less than that represented by previously discussed embodiments of the invention since the pressure head at which air is admitted must equal the total depth of the bubbler tube below the top surface plus allowances while the buoyancy is effectively applied only to the height of the water above the bubbler tube. Nonetheless, this apparatus is capable of bringing aeration to the point desired under the most adverse conditons.

Figures 7, 8:
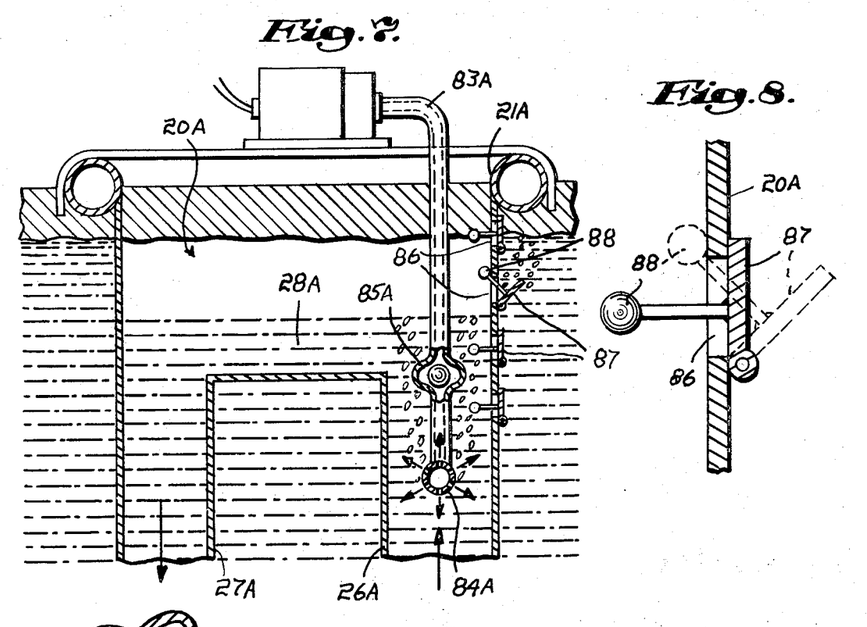
FIG. 7 is a view similar to FIG. 5 illustrating another embodiment of the invention.
FIG. 8 is a section on a substantial increase in scale taken vertically through one of the ports.
Figure 9:
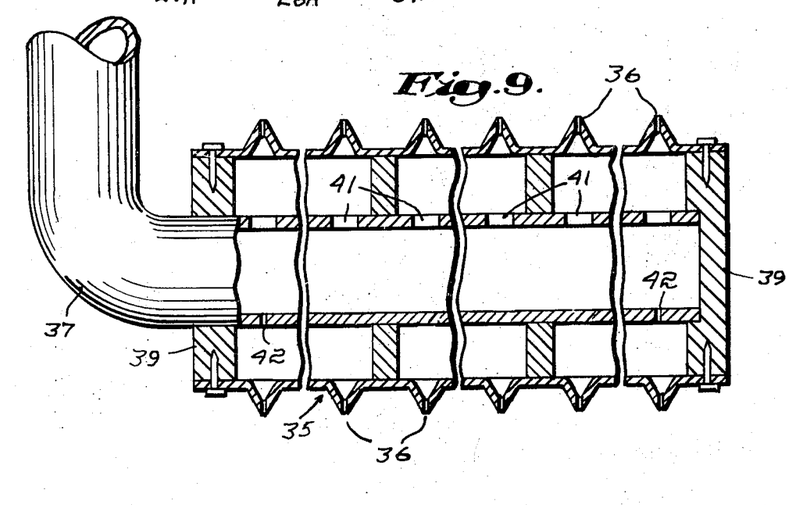
FIG. 9 is a lengthwise vertical section of an air distributor.

The embodiment of the invention illustrated by FIGS. 7 and 8 is similar to that of FIGS. 1 and 2 but uses the air delivery system of the embodiment just described and corresponding parts are distinguished by the suffix addition A. In this embodiment the float 21A of the aerator 20A is shown as frozen into the ice so that the ice becomes a roof overlying, but spaced above the upper ends of the inlet duct 26A, the outlet duct 27A and the transfer channel 28A providing a chamber that must be vented. For venting purposes, the side wall of the aerator 20A has a series of ports 86, each shown as having a pivotal damper 87 provided with a weight 88 normally maintaining the damper 87 closed. Air pressure building up in the chamber opens the uppermost damper that is not frozen in the ice thus maintaining the apparatus in an operable state. This embodiment is shown as having the air lift of FIGS. 5 and 6 and parts corresponding thereto are distinguished by the suffix addition A to the appropriate reference numerals used in detailing this embodiment. It should be noted that when the top surface of a lake is frozen the density of the whole body of water except for the top few feet is very close to 1.0000. The water density adjacent to the ice is 0.99987.

It should be further noted that all water density figures given are for fresh water. Sea or bay waters would have higher densities.

Figure 10:
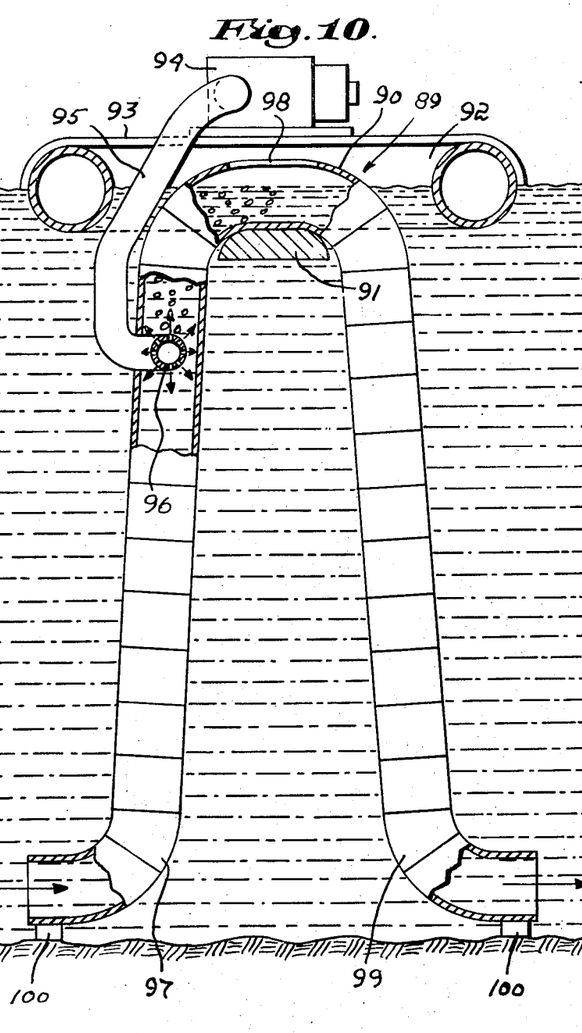
FIG. 10 is a partly sectioned side view of aerating apparatus in accordance with yet another embodiment of the invention.

In FIG. 10, an embodiment of the invention is shown in which the aerator, generally indicated at 89 comprises a flexible duct having a central or transfer portion 90 draped over a subsurface support 91 with which the float 92 is provided. The float 92 also has a support 93 for the air source 94 whose air delivery pipe 95 is in communication with a transversely disposed bubble tube 96 in the inlet side 97 of the duct. The bubble tube 96 may be identical to those previously detailed. At the highest part of the transfer portion 90, which is above the level of the water, there is a port 98 permitting the escape of air bubbles before the aerated water descends through the return side 99 of the duct. The inlet and outlet ends of the duct are shown as having weights 100. The duct 86 may be of any desired cross sectional size and shape including that of the ducts of the previously detailed embodiments of the invention and it may, as indicated in FIG. 10, be of an accordian type.

Figure 12:
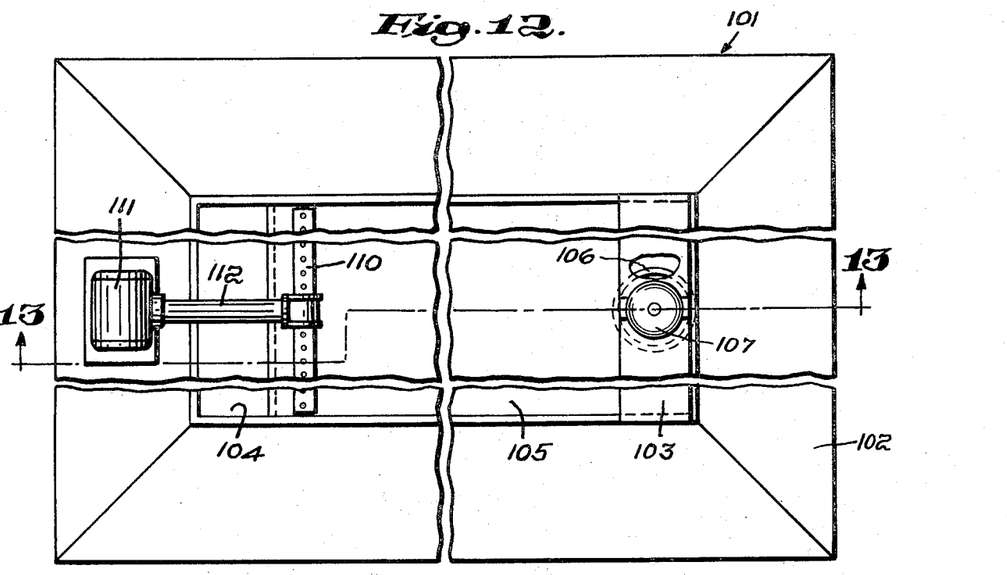
FIG. 12 is a top plan view of an aerator in accordance with an embodiment of the invention in which the flow is mechanically inducted, the aerator being broken away to foreshorten the drawing.
Figure 13:
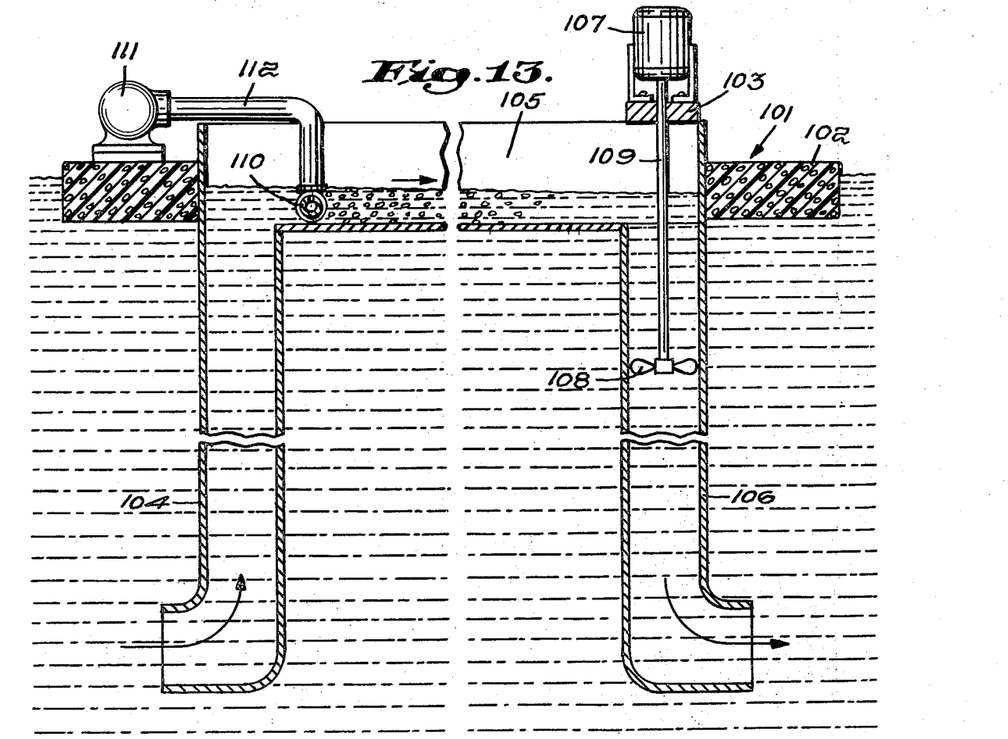
FIG. 13 is a section taken approximately along the indicated line 13—13 of FIG. 12.

The aerator of FIGS. 12 and 13 has water circulating means and an air supply independent of each other. This, of course, adds to th first cost as two pieces of powered equipment are needed. Its chief advantages are the ability to bubble a large excess of air at a fractional pound per square inch pressure with very little power use, and, secondly, the fact that the water moves transversely to the upward flow of air.

The aerator of FIGS. 12 and 13, generally indicated at 101 is supported by a float 102 and has a support 103.

The aerator 101 has an inlet duct 104, here shown as rectangular in cross section, connected by a transfer channel 105 to a cylindrical return duct 106. A motor 107 mounted on the support 103 drives the propeller 108 by means of the drive shaft 109 forcing water down through the duct 106, thereby establishing flow through the aerator in a continuous stream. A bubbler tube 110 located adjacent to and extending transversely of the inlet duct 104 is supplied with air under comparatively very light pressure by a blower 111 through air duct 112. The blower 111 is here shown as being supported by the float 102.

Figure 14:
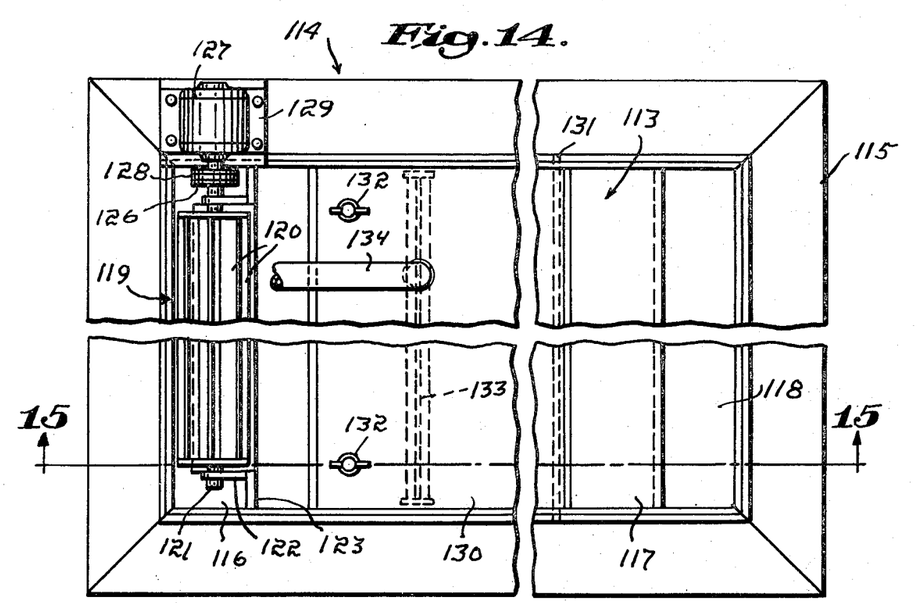
FIG. 14 is a top plan view of another embodiment of the invention in which the flow is induced by an impeller and aeration effected by flowing the water through a venturi arranged to aspirate air, the aerator being broken away to foreshorten the drawings.
Figure 15:
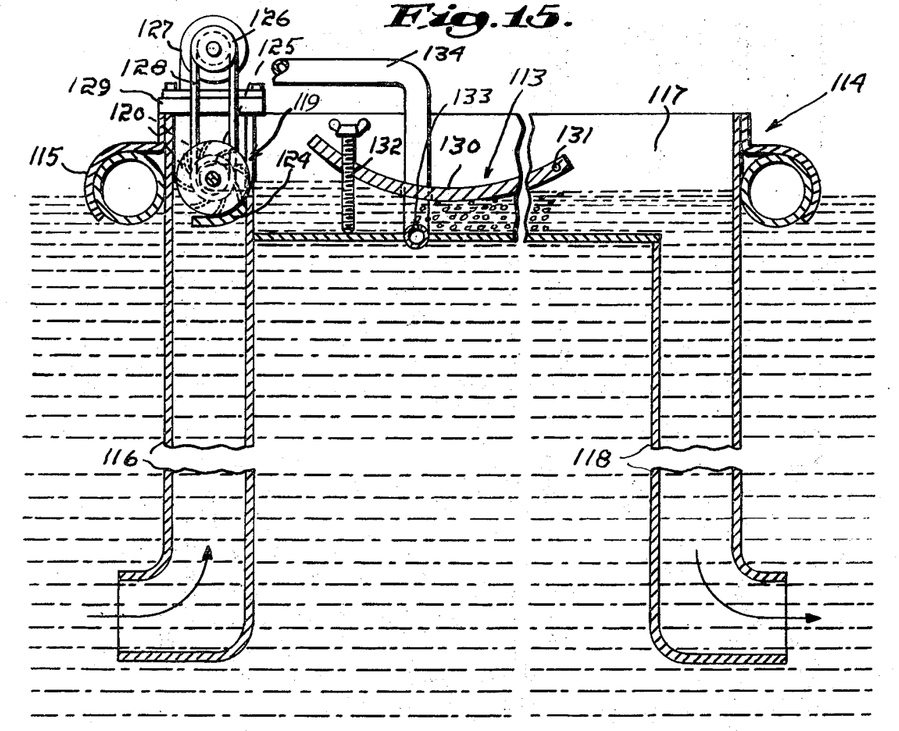
FIG. 15 is a section taken approximately along the indicated line 15—15 of FIG. 14.

The aerator of FIGS. 14 and 15 employs the motion of mechanically circulated water to effect air aspiration in a venturi generally indicated at 113. This is a very economical system in that the only energy given up to aeration other than that needed for circulation is friction drop in the venturi plus the volume of air drawn in times the pressure head after deceleration but would be impractical for various reasons in climates where freezing is a problem.

The aerator of FIGS. 14 and 15, generally indicated at 114, includes a supporting float 115 and has an inlet duct 116, a transfer conduit or duct 117 and an outlet duct 118. An impeller generally indicated at 119 has vanes 120 curved in a trailing direction and is mounted on a shaft 121 and supported with minimal clearance by end mounts 122 which in turn are mounted to wall portions 123. An arc sector 124, see FIG. 15, concentric with the shaft 121 and positioned just beyond the sweep of the vanes 120 is also supported by the end mounts 122 close to the junction of the ducts 116 and 117.

The impeller shaft 121 has a pulley 125, about which and the pulley 126 of the motor 127 a belt 128 is trained. The motor support is indicated at 129. The impeller 119 is so positioned at the top of the inlet duct 116 as to literally "sweep" water over the arc sector 124 to whatever height is necessary for the water to circulate at the supply rate of the impeller. An venturi 113 is shown as including the transfer duct 117 and an upper rigid and smooth surfaced wall 130 the width of the transfer duct 117 and arcuate longitudinally considered. One end of the venturi wall 130 is pivotally connected to the walls of the duct 117 as at 131 and adjusting screws 132 threaded through tapped holes in the walls 130 permit a measure of adjustment in the height of the wall 130 relative to the bottom of the transfer duct to optimum operating conditions. A slit tube 133 is held in place across the bottom of the duct 117 close to the lowest part of the throat of the venturi 113 and is supplied with air through an air supply tube 134 opening upwardly through the top of the venturi 113 to the open air.

Figure 16:
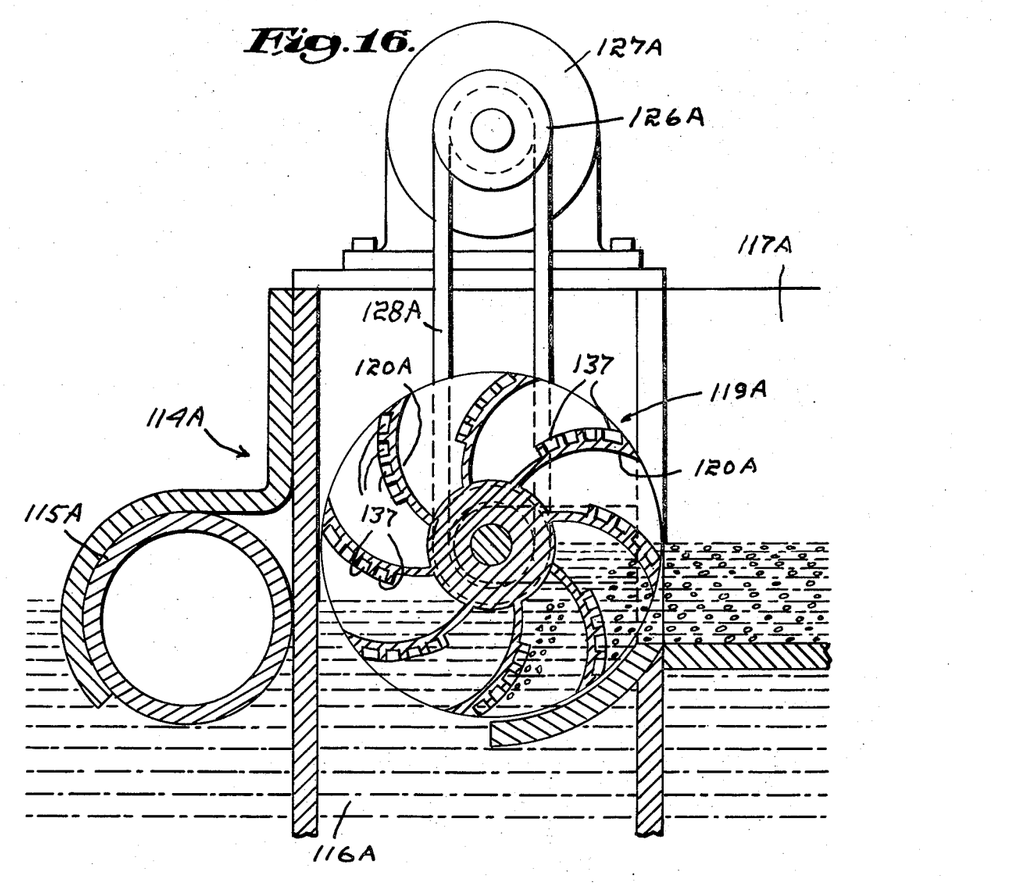
FIG. 16 is a fragmentary and partly sectioned side view of an aerator having an impeller to induce the water flow and, at the same time, aerate the elevated water.
Figure 17:
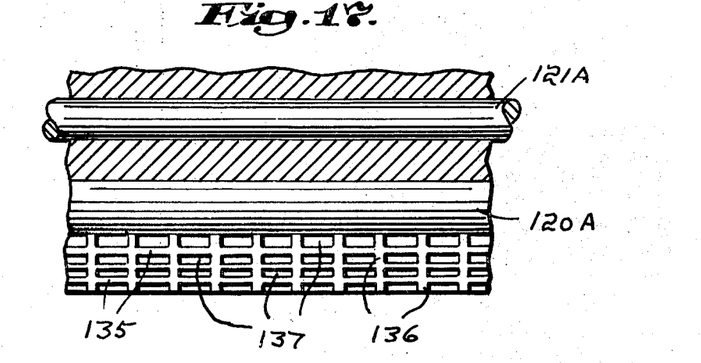
FIG. 17 is a fragmentary and partly sectioned view showing a plan view of the air-collecting pockets on the leading face of one of the blades.

It is entirely feasible to modify the impeller of FIGS. 14 and 15 so that is is operable to both circulate and aerate the water and reference is made to FIGS. 16 and 17.

The impeller shown in FIGS. 16 and 17 is or may be quite similar to that shown in FIGS. 14 and 15 and, accordingly, corresponding parts are distinguished by the suffix addition A to the appropriate reference numerals of FIGS. 14 and 15 and such corresponding parts are not again described.

The impeller 119A has the leading face of its blades 120A provided with a series of longitudinal ridges 135 and a series of ridges 136 extending at right angles thereto to establish a multiplicity of pockets 137 to entrap air as the impeller rotates. The pockets 137 are dimensioned so that surface tension does not interfere with the displacement of entrapped air by water as the impeller 119A rotates. The volume of pockets 137 is in the same proportion to the total displacement as the proportion of air that is desired be introduced.

In operation air entrapped by the pockets 137 is forced down under the water and leaves them as bubbles when the direction of vane 120A permits. The bubble-displacing water is carried aloft, an allowable energy waste, until the vanes allow it to spill out and be replaced with air. The rest of the apparatus used is or may be the same as that shown in FIGS. 15 and 15 except that the venturi is no longer needed and the transfer duct 117A can be made shorter.

The design of ducts, the means for generating stream flow, and the source of air supply can be adapted to the optimum for the particular application.

The general design provides aeration and motion to a considerable cross section of water at a low velocity.

The temperature and corresponding density of the circulating water are not materially affected by air bubbles, even in great excess and at widely different temperatures. For example, let us assume one cubic foot of air, twenty times the theoretical requirement, having a temperature of 120°F, and dew point 90°F giving up all its temperature and moisture difference to one cubic foot of 40°F water.

Temperature drop, 80°, times specific heat, 0.4, times weight, one-twelfth pound, equals 2.7 BTUs.

Vapor content, 0.002 pounds, times total heat of steam, 1100 BTUs per pound, equals 2.2 BTUs.

Total of 4.9 BTUs into 62 pounds of water would increase its temperature by 0.08°F.

Since under summer operating conditions the temperature of the water inside the ducts and that of the ambient water may differ considerably it may be advisable to construct the portions of duct above the thermocline of materials having poor thermal conductivity or to double layer with non-circulating water between the layers. This would materially lessen heat transfer by convection.

Whereas the aerators shown have the aerating means self-mounted, there is nothing to preclude the use of a shore based air supply actuating several units. For example, in application to a river, such as the Potomac, these units could have their intake ducts in relatively shallow water near a shore and their outflow ducts so disposed as to conduct the aerated water outward to the area where aeration is desired. The ducts could be rigid, as of plastic, and could be expanded in cross section at their outlets to further reduce velocity of the flow and not stir up bottom sediments.

A three horsepower power supply could deliver essentially saturated water through ducts aggregating 30 square feet in cross sectional area at a rate of roughly 800,000 gallons per hour to the areas desired.

For application to a very large deep area there is nothing to preclude a large multiplicity of units connected as to booms and having a central power supply as on a tugboat.

From the foregoing it will be appreciated that the invention provides a substantial range of means to aerate a body of water at any selected depth and operable under a wide range of conditions to meet a wide range of requirements.

I claim:

1. The method of aerating a body of open water such as a lake, pond, river, or bay, said method comprising the steps of establishing depending inflow and outflow courses in said body, circulating the water through said courses in a continuous flow and introducing air in the form of bubbles into said flowing water to aerate the same, transferring the aerated water to the outflow course while providing a time delay in such transfer for the escape of undissolved portions of air upwardly from said aerated water and inhibiting substantial recirculation of the aerated water through said courses.

2. The method of claim 1 in which the step of establishing a continuous stream and introducing air therein comprises the introduction of air into the inflow course in the form of a horizontal series of bubbles both to circulate and actuate the water therein.

3. The method of claim 2 in which the air escapes directly to the atmosphere and the additional step of providing an alternate escape route therefor operable only should the surface of the water undergoing transfer become frozen.

4. The method of claim 2 in which the depth at which the air is introduced is at a fraction of the depth at which aeration is wanted.

5. The method of claim 1 in which the downward course is in communication with a depth greater than that into which the upward course extends.

6. The method of claim 1 in which the body of water is of such depth that different water densities exist therein, the inflow course is in communication with a depth where the water has a density and the outflow course is in communication with a depth where the water has a different density whereby the difference in density between the aerated water and that of the depth at which it is discharged causes convection currents mixing the water between the two levels without substantial recirculation.

7. The method of claim 1 in which the body of water is of such depth that different water densities exist therein, the inflow and outflow courses are in communication with a depth where the water density is the same and is greater that that of the water at a lesser depth.

8. The method of claim 1 and the additional step of discharging the aerated water in a substantially horizontal direction.

9. The method of claim 1 in which the circulating and aerating steps are separate.

10. An aerator for a body of open water such as a lake, pond, river, or bay, said aerator being positionable therein and comprising depending inflow and outflow conduit portions, means interconnecting the upper ends of said portions wholly or in part below the surface level of the body of water and with their lower ends so disposed relative to each other as to inhibit substantial circulation therebetween, means in one of said portions to effect the flow of water upwardly through the inflow portion into said interconnecting means and downwardly through the outflow portion as a continuous stream and to aerate the circulating water before its entry into the outflow portion, and said interconnecing means being oriented to provide a time delay in the flow of the elevated water into the outflow portion to permit the escape of air therefrom.

11. The aerator of claim 10 in which the means effecting the continuous flow of water and aerating the circulating water comprises a single agency.

12. The aerator of claim 11 in which the agency is an impeller supported at the upper end of the inflow course with its axis horizontal and transverse with respect to the connecting means, the impeller includes lengthwise blades, there is a barrier that is arcuate with respect to the impeller and is disposed between it and the connecting means and over which it must lift water, and the vanes include on their leading faces a substantial number of air-entrapping pockets.

13. The aerator of claim 10 in which the means effecting the continuous flow of water and aerating the circulating water comprises separate agencies.

14. The aerator of claim 13 in which one agency is an aerating means extending transversely of the interconnecting means and the other agency is a mechanical circulator.

15. The aerator of claim 14 in which the mechanical agency is an impeller in the downflow course.

16. The aerator of claim 13 in which one agency is a venturi in the interconnecting means including an air inlet disposed in a position that air is aspirated into the water flowing through the venturi.

17. The aerator of claim 13 in which one agency is aerating means in the interconnecting means and the other agency is an impeller being supported at the upper end of the inflow course with its axis horizontal and of a type having lengthwise vanes and there is a barrier arcuate with respect to the impeller and providing a boundary therefor over which the impeller lifts water.

18. The aerator of claim 10 in which the single agency is air delivery means and the air delivery means include a bubbler in the inflow conduit portion in a position both to aerate and raise the water therein to provide a head in the outflow conduit portion.

19. The aerator of claim 18 in which the air delivery means is in communication with the interior of the inflow conduit portion at a fraction of the depth to which the aerated water is to be delivered.

20. The aerator of claim 18 in which the interconnecting means providing for the escape of bubbles includes a closed chamber disposable below the surface of the body of water and is provided with a relief operable by an air pressure build-up within the chamber.

21. The aerator of claim 20 in which the relief includes a conduit including an outlet extending upwardly to an extent such that it will be above the ice level and provided with a float valve opened by air supplied to the aerating means and closed by outside water pressure if the air supply fails.

22. The aerator of claim 20 in which the relief includes an outlet tube having a downwardly disposed discharge end through which air may excape.

23. The aerator of claim 22 in which the relief further includes a vertically spaced series of flapper valves opened by air pressure in the chamber in excess of a predetermined level.

24. The aerator of claim 18 in which the means providing for the escape of bubbles includes a transfer channel.

25. The aerator of claim 10 in which the outflow portion reaches a greater depth than the inflow portion.

26. The aerator of claim 10 in which at least one of the conduit portions comprises a series of flexible sections and means interconnecting the sections.

27. The aerator of claim 26 in which the section-connecting means includes inner and outer reinforcements overlapping the proximate ends of the sections and interconnected therethrough.

28. The aerator of claim 10 and an auxiliary air lift in the upper end of one portion operable to purge the aerator of the upper warm water and having its discharge externally of the aerator.

29. The aerator of claim 10 in which the inflow and outflow conduit portions include a common wall and a transversely disposed flange overlies a portion of one conduit portion.

30. The aerator of claim 10 in which the means effecting the flow of the water creates a head on the outflow conduit portion and the means providing for the escape of bubbles includes a barrier extending downwardly a short distance into the head-creating water adjacent the outflow conduit portion to prevent the flow of bubble-containing water therein.

31. The aerator of claim 10 in which the inflow and outflow portions include a series of flexible sections and means interconnecting their proximate ends, the connecting means comprising an external frame common to both portions and an inner frame for each of them, the frames being interconnected through the proximate ends of the sections.

32. The aerator of claim 10 in which the conduit and intermediate portions are sections of a flexible conduit.

33. The aerator of claim 32 and a float including a support over which the intermediate portion is draped.

34. The aerator of claim 32 in which the conduit is of the accordian type.

35. The aerator of claim 10 in which the body of open water is of such depth that different water densities exist therein and the conduit portions are both of sufficient length to be in communication with water of the same density, said density being higher than that of water nearer the surface.

36. The aerator of claim 10 in which the lower end of the outflow conduit portion is in the form of a port disposed to effect the discharge of the aerated water in a substantially horizontal direction.

* * * * *